Patented Apr. 3, 1928.

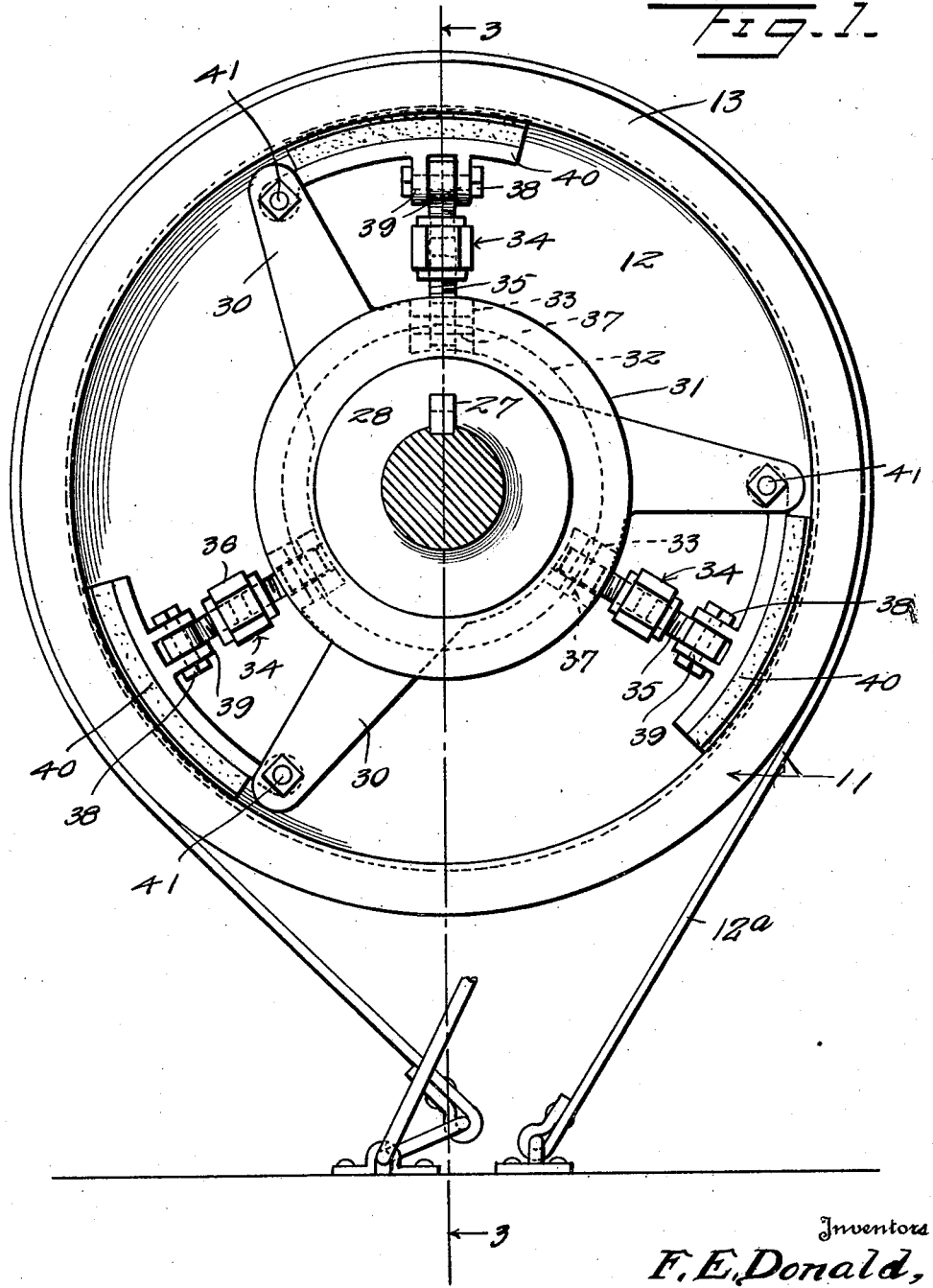

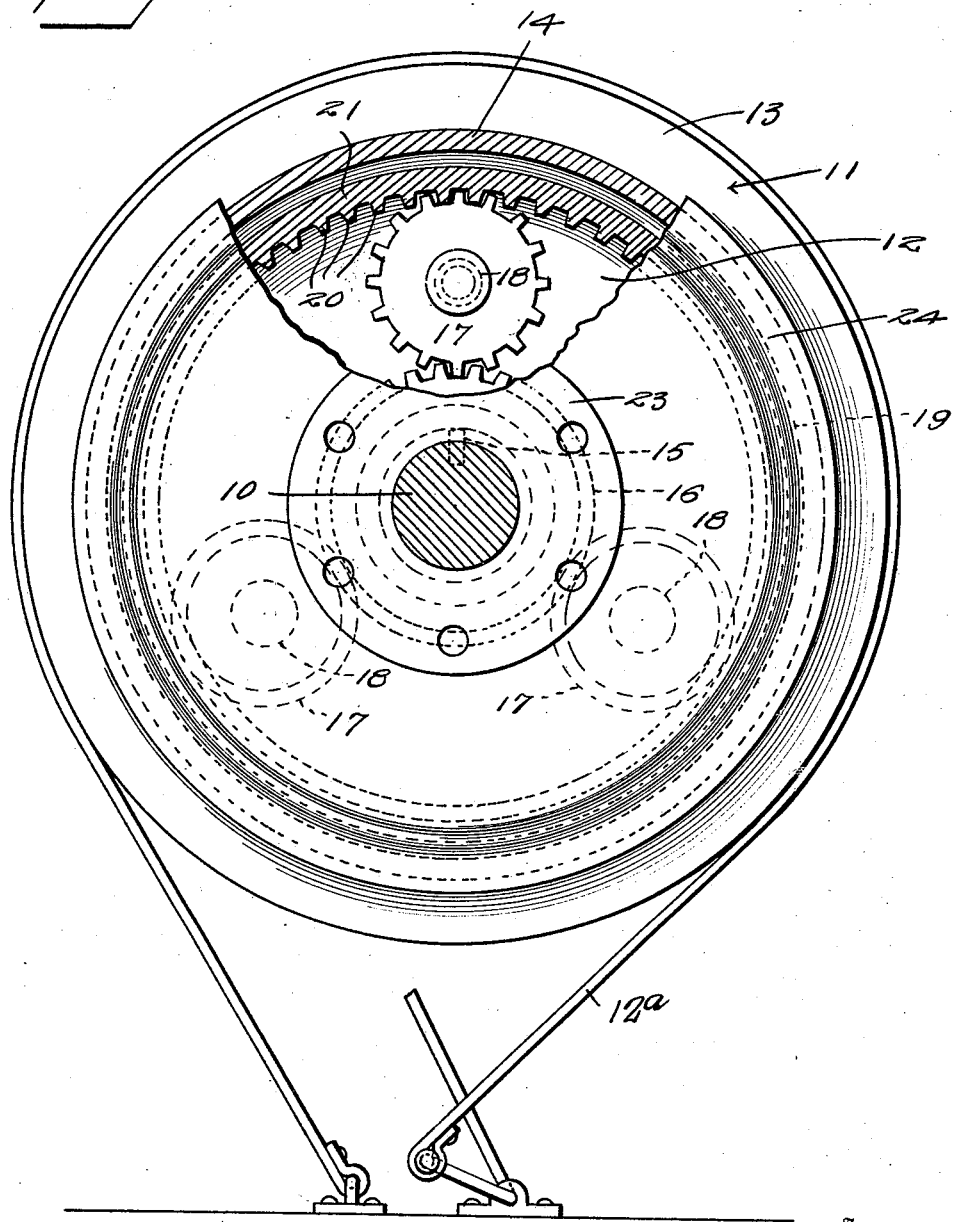

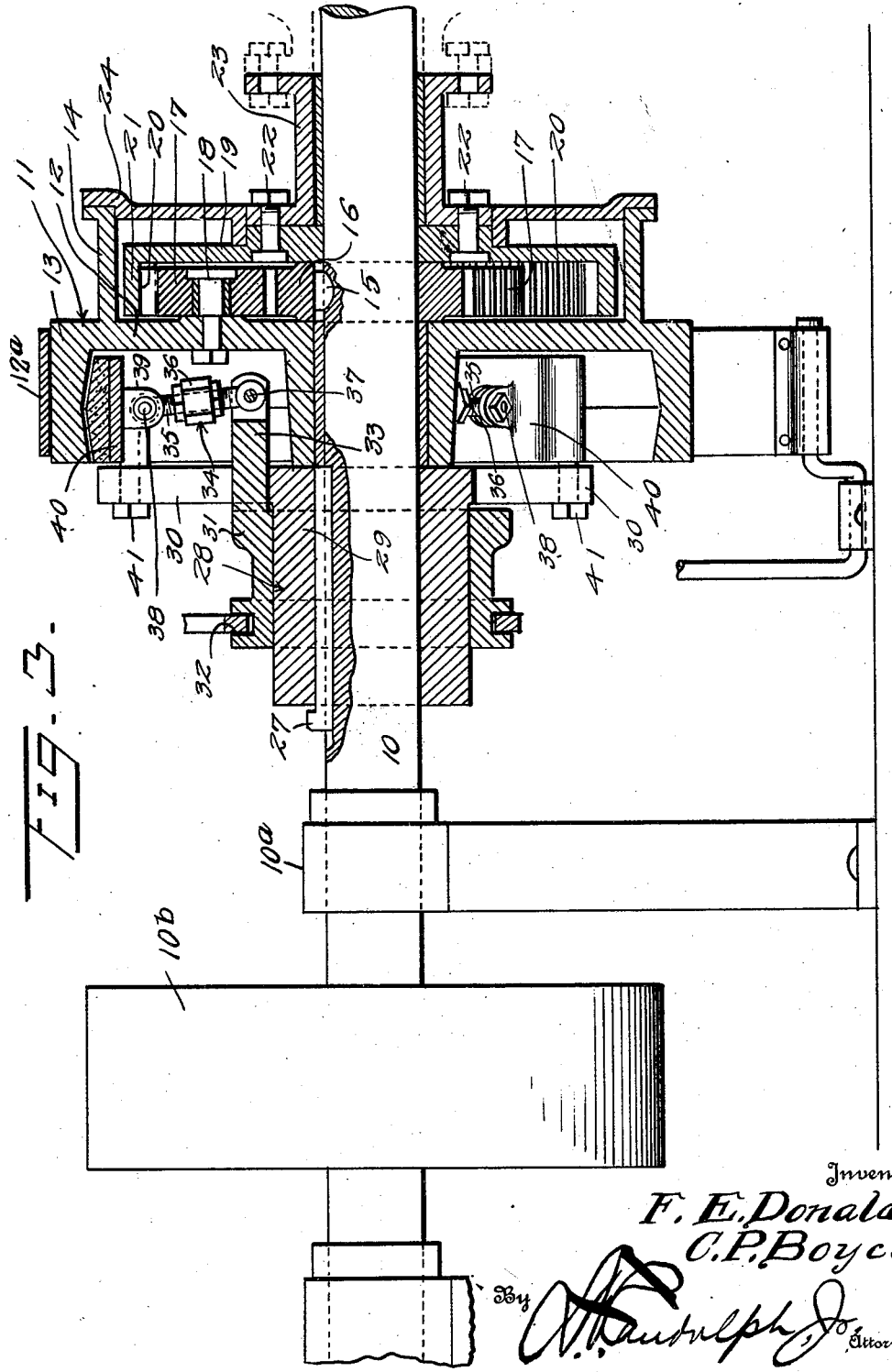

1,665,159

UNITED STATES PATENT OFFICE.

FLOYD E. DONALD AND CHARLES P. BOYCE, OF CORSICANA, TEXAS.

PLANETARY REVERSIBLE CLUTCH.

Application filed April 17, 1926. Serial No. 102,703.

This invention relates to a planetary reversible clutch for use in connection with internal combustion engines especially of the type which operate one way only as used in the oil field.

It is aimed to provide a novel, efficient, durable, compact and comparatively inexpensive construction possessing the advantages, details, and features of construction as hereinafter set forth in part and illustrated in the accompanying drawings.

In said drawings:—

Figure 1 is an end elevation of the device;

Figure 2 is an opposite end elevation, parts being broken away to disclose interior gearing, and Figure 3 is a central longitudinal sectional view taken on the line 3—3 of Figure 1.

Referring specifically to the drawings, 10 designates a driven shaft which is journaled in suitable bearings 10ª. A drum 11 is loose on said shaft and capable of turning relatively thereto. Said drum 11 has a main wall 12 from which a laterally extending pulley rim 13 extends, so that a brake band 12ª may engage the same. Extending from the opposite side of wall or plate 12 is an annular flange 14. If desired, band 12ª may be engaged with flange 14 instead of rim 13.

Keyed to the shaft 10 as at 15 is a gear wheel 16 which meshes with a series of pinions 17, journaled on bolts or removable stub shafts 18, fastened to the said wall 12.

A planetary gear wheel is shown at 19, having its teeth provided at 20 on a flange 21. The pinions 17, mesh with the teeth 20. By means of bolts or the like 22, gear wheel 19 is connected to an attaching member or bushing as at 23 which serves as the driver for the aforesaid driven shaft 10. The latter may transmit its power to any suitable work as by a belt trained over a pulley 10ᵇ on such shaft. A cover plate 24, annular in form, may be provided to engage the outer side of the flange 14 and engage portions of the hub of the gear wheel 19 and the bushing 23.

Keyed to the shaft 10 as at 27 is a bracket 28, having a sleeve 29 and a suitable plurality of generally radiating arms 30.

A sleeve 31, slidable along the collar or sleeve 29, is operable by a fork or the equivalent of any approved type applicable to the groove 32. Sleeve 31 has longitudinally extending lugs 33. Radiating relatively to said lugs 33 are rods 34 which have sections 35 adjustably connected together by nuts 36 so that they may be lengthened or shortened. These rods 34 have one section 35 pivoted as at 37 to the lugs 33 and their other sections 35 pivoted as by means of bolts 38 between lugs 39 of brake shoes 40. Said brake shoes 40 are pivoted as by means of bolts 41 to the arms 30.

As will be understood, the brake shoes 40 are normally out of engagement with the inner surfaces of the flange 13 and hence as the shaft 10 is driven, the drum 11 is not positively connected therewith. However, in order to positively connect the drum with the shaft 10 and thereby drive an auxiliary device from shaft 10 or its pulley 10ᵇ, sleeve 31 is shifted so that the normally inclined rods 34 will tend to straighten in a plane truly at a right angle to the axis of shaft 10, thereby moving the free ends of the brake shoes 40 into frictional and braking contact with the inner surface of the band 13, such brake shoes moving from the pivot 41. As a result, the parts are connected together and move unitarily through the power derived from driver 23 and the coupled engine, and the construction forms a planetary reverse so as to coact with such a driver, an engine shaft or the equivalent moving in but one direction.

Changes may be resorted to provided they fall within the spirit and scope of the invention.

We claim as our invention:—

A device of the class described comprising a shaft, a bracket rigid with said shaft having outwardly extending arms, a gear wheel rigid with said shaft, a drum loose on said shaft disposed principally between said bracket and said gear wheel, a sleeve slidable on said bracket, brake shoes pivoted to said arms, operative connections between said arms and said sleeve, said drum having a main wall and first and second flanges extending laterally on opposite sides thereof, said shoes being engageable with the first flange, gear wheels pivoted to said main wall and in mesh with the first mentioned gear wheel, a planetary gear wheel having a laterally extending wall provided with teeth in mesh with those of the second mentioned gear wheel, a second flange extending outwardly of and across the said planetary gear wheel, and an attaching member extending from the planetary gear wheel.

In testimony whereof we affix our signatures.

FLOYD E. DONALD.
CHARLES P. BOYCE.